३,५८४,०१९
PROCESS FOR THE PREPARATION OF ALIPHATIC ESTERS

Gustave Bryant Bachman, Lafayette, Ind., Gerald M. Tullman, Creve Coeur, Mo., and George F. Kite, Springdale, Pa., assignors to Purdue Research Foundation, Lafayette, Ind.
No Drawing. Filed Nov. 26, 1968, Ser. No. 779,229
Int. Cl. C07c 67/00
U.S. Cl. 260—410.9                          7 Claims

ABSTRACT OF THE DISCLOSURE

A process for preparing aliphatic esters by reacting an aliphatic carboxylic acid anhydride or a mixture thereof with mercuric iodate.

SUMMARY OF THE INVENTION

This invention relates to a process for the preparation of aliphatic esters from aliphatic carboxylic acid anhydrides. In a particular aspect, this invention relates to a process for the preparation of aliphatic esters by the reaction of an aliphatic carboxylic acid anhydride and mercuric iodate.

Aliphatic esters are well known chemical compounds and methods for preparing them have been described in a number of publications. The usual procedure is to react an aliphatic alcohol and an aliphatic carboxylic acid, or anhydride thereof, in the presence of a catalyst such as zirconium chloride, titanium dioxide, activated carbon and potassium hydrogen sulfate.

It is an object of the present invention to provide a process for the preparation of aliphatic esters.

It is a further object of the present invention to provide a process for the preparation of aliphatic esters from aliphatic carboxylic acid anhydrides.

Other objects and advantages of the present invention will be apparent from the description herein.

It has been discovered in accordance with the present invention that aliphatic esters are obtained by reacting an aliphatic carboxylic acid anhydride or a mixture thereof with mercuric iodate. In the esters so produced, the alcohol portion of the molecule contains one less carbon atom than the acid anhydride from which it is derived. The mercuric iodate is converted to mercuric iodide, and carbon dioxide is evolved as a by-product.

DETAILED DESCRIPTION

In carrying out the process of the present invention, the aliphatic carboxylic acid anhydride and the mercuric iodate are reacted at a temperature and for a period of time sufficient to effect formation of the aliphatic ester. In place of mercuric iodate there may be substituted a mixture of mercuric iodide and an oxidizing agent capable of oxidizing iodine or iodide to the iodate state. Such oxidizing agents include, but are not limited to, mercuric bromate, nitric acid, nitrogen tetroxide, ozone, valence-4 lead, etc. The two-component mixtures are employed in a proportion generally, but not necessarily, of about a 1:1 molar ratio. The components may be mixed prior to forming the reaction mixture, but equally good results are obtained by adding the components to the reaction mixture individually. Preferably, mercury iodide treated with ozone is employed. The mercuric iodide is recovered from the process, again treated with ozone, again employed in the process, etc., in an efficient cyclic manner.

In a contemplated embodiment of the present invention, the mercuric iodide is used in catalytic amounts in the presence of excess oxidizing agent, e.g. ozone.

The process of the present invention may be carried out over a wide temperature range. For example, a temperature in the range of from about 80 to about 180° C. is typically employed. Temperatures below about 80° C. are generally not practical because of the slow rate of reaction, while temperatures above about 180° C. tend to cause substantial decomposition of mercuric iodate. A temperature in the range of from about 120 to 160° C. is preferred.

The molar ratio of aliphatic carboxylic acid anhydride to mercuric iodate also may vary over a wide range with a molar ratio of acid anhydride to mercuric iodate of from about 10:1 to about 1:10 being generally preferred. A ratio of anhydride to mercuric iodate of from about 2:1 to 1:1 is particularly preferred.

Any suitable aliphatic carboxylic acid anhydride or mixture thereof can be employed in the process of the present invention. The term aliphatic as used herein is intended to include alkyl and aralkyl acid anhydrides, both substituted and unsubstituted. Typically suitable aliphatic carboxylic acid anhydrides are represented by the formula (RCO)O(OCR') wherein R and R' may be the same or different and can be alkyl radicals containing, for example, from 1 to about 20 carbon atoms. R and R' may also include substituent groups which are largely unreactive under the reaction conditions, such as ethers, halogens, nitro groups, aromatic rings, alkoxy groups, and the like. Preferably carboxylic anhydrides in which R and R' are the same and 1 to 20 carbon atoms are employed. Examples of suitable carboxylic acid anhydrides include: acetic anhydride, propionic anhydride, butyric anhydride, valeric anhydride, stearic anhydride, caproic anhydride, caprylic anhydride, the mixed anhydride of acetic and propionic acids, the mixed anhydride of butyric and valeric acids, the mixed anhydride of caproic and stearic acids, 2-methyl-butyric anhydride, 2-ethyl-caproic anhydride, 2-methyl-stearic anhydride, 4-methyl-valeric anhydride, 6-ethyl-stearic anhydride, pivalic anhydride, cyclohexane carboxylic acid anhydride, 3-chloro-butyric anhydride, 3-ethoxy-propionic anhydride, 4-nitro-valeric anhydride, 6-phenyl-stearic anhydride, 3-ethyl-8-methoxy-palmitic anhydride, the mixed anhydrides of acetic and 2-methyl-butyric acids, the mixed anhydrides of caproic and 2-methyl-stearic acids, the mixed anhydrides of cyclohexane carboxylic and 3-chloro-butyric acids, the mixed anhydrides of stearic and 2-methyl-stearic acids, the mixed anhydrides of 3-chloro-butyric and propionic acids, the mixed anhydrides of 3-ethoxy-propionic and 4-nitro-valeric acids, and the like.

The reaction of the present invention is conveniently carried out by mixing the mercuric iodate in the anhydride. If desired, or if mercuric iodate is not sufficiently soluble in the anhydride, a suitable solvent may be employed. Examples of such solvents include aliphatic acids such as propionic acid and acetic acid, dichlorobenzene, dibromoethane, nitroethane, carbon tetrachloride, and the like.

The process should be carried out under substantially anhydrous conditions to avoid undesirable side reactions, such as conversion of the anhydride to the acid.

The aliphatic esters prepared in accordance with the process of the present invention may be recovered by any suitable procedure. Such procedures include distillation and solvent extraction.

The invention will be understood more fully by reference to the following specific examples. It is understood that the examples are presented for the purpose of illustration only and are not intended as a limitation of the invention. In the examples the aliphatic carboxylic acid anhydrides were dried before reaction over $P_2O_5$ at 110° C. under reduced pressure.

EXAMPLE 1

To a 50 ml. two-necked, round-bottom reaction flask containing 6.52 grams (0.05 mole) propionic anhydride were added 2.75 grams (0.005 mole) anhydrous mercuric iodate to form a reaction mixture. A Dry Ice condenser was attached to the reaction flask and an ascarite trap, which was connected to a wet test meter, was attached to the condenser. The mixture in the flask was heated with agitation in an oil bath to approximately 140° C. and held at that temperature until evolution of $CO_2$ as measured by the wet test meter ceased. The thus obtained reaction mixture was cooled by placing it in the Dry Ice-acetone bath. The reaction mixture was then removed from the Dry Ice-acetone bath, allowed to warm to room temperature and filtered to remove solid materials. The reaction mixture was shown by analysis to contain 0.96 gram of ethyl propionate and mercuric iodide. The latter was recovered and converted to the iodate by ozonization.

EXAMPLE 2

To a two-necked, round-bottom reaction flask equipped as in Example 1 and containing 6.57 grams (0.05 mole) of propionic anhydride were charged 2.28 grams (0.005 mole) mercuric bromate and 2.27 grams (0.005 mole) mercuric iodide to form a reaction mixture. The temperature of the mixture was heated with agitation in an oil bath to approximately 140° C. and held at that temperature until evolution of $CO_2$ as measured by the wet test meter ceased. The thus obtained reaction mixture was cooled by placing it in the Dry Ice-acetone bath. The reaction mixture was then removed from the bath, allowed to warm to room temperature and filtered to remove solid materials. The reaction mixture was shown by analysis to contain 0.780 gram ethyl propionate.

EXAMPLE 3

To a 200 ml. three-necked, round-bottom reaction flask containing 9.35 grams (0.05 mole) valeric anhydride were added 10.85 grams (0.05 mole) red mercuric oxide and 15 ml. of 1,2-dibromoethane to form a reaction mixture. A water condenser was connected to the flask and a wet test meter was attached to the condenser. The temperature of the mixture was heated by means of an oil bath with agitation to about 125° C. and maintained at that temperature for approximately one hour. During the heating period, 12.70 grams (0.05 mole) of iodine dissolved in 75 ml. of 1,2-dibromoethane was slowly added from a pressure equalizing dropping funnel to the mixture. At the end of the heating period, gas evolution ceased and the resulting reaction mixture was cooled to room temperature. The reaction mixture was shown by analysis to contain 3.96 grams (0.025 mole) of butyl valerate.

EXAMPLE 4

To an ozonator tube were charged 15 grams of acetic anhydride and 3.0 grams of mercuric iodide. Ozone was passed through the resulting mixture. The amount of ozone employed was about 25% in excess of the amount required to decolorize the mercuric iodide. The thus treated material was transferred to a 50 ml. round-bottom flask and heated under reflux at about 100-120° C. until evolution of carbon dioxide ceased. The reaction mixture was then cooled to 0° C. and filtered to remove mercuric iodide. The reaction mixture was then diluted with diethyl ether, washed with $NaHCO_3$ to remove any excess acetic anhydride and then distilled. Methyl acetate was obtained in a conversion of 82% based on the mercuric iodide.

EXAMPLE 5

The procedure of Example 4 was repeated in all essential details with the exception that caproic anhydride was substituted for the acetic anhydride. Amyl caproate was obtained.

EXAMPLE 6

The procedure of Example 4 is repeated in all essential details with the exception that stearic anhydride dissolved in 15 ml. of o-dichlorobenzene is substituted for acetic anhydride and heptadecanyl stearate is obtained.

Since many embodiments of this invention may be made and since many changes may be made in the embodiments described, the foregoing is to be interpreted as illustrative only and the invention is defined by the claims appended hereto.

We claim:
1. A process for the preparation of aliphatic esters comprising reacting an aliphatic carboxylic acid anhydride with mercuric iodate at a temperature in the range of from about 80 to 180° C. and for a length of time sufficient to effect formation of said aliphatic esters and mercuric iodide.
2. The process of claim 1 wherein the aliphatic carboxylic acid anhydride is represented by the formula (RCO)O(OCR'), wherein R and R' are selected from the group consiting of alkyl, aralkyl, and alkoxy-, halogen-, nitro-, and phenyl-substituted alkyl radicals containing from 1 to about 20 carbon atoms, and R and $R^1$ can be the same or different.
3. The process of claim 1 wherein the reaction is carried out at a temperature in the range of from about 120 to about 160° C.
4. The process of claim 1 wherein said mercuric iodide is recovered, oxidized to mercuric iodate, and recycled to said process.
5. The process of claim 1 wherein the mercuric iodate is provided by mercuric bromate and mercuric iodide in a mole ratio of about 1:1.
6. The process of claim 1 wherein the mercuric iodate is provided by mercuric oxide and iodine in a mole ratio of about 1:1.
7. The process of claim 1 wherein the mercuric iodate is provided by catalytic amounts of mercuric iodide and an excess of ozone is maintained in said process.

No references cited.

LEWIS GOTTS, Primary Examiner

D. G. RIVERS, Assistant Examiner

U.S. Cl. X.R.

260—404, 408, 410.5, 410.6, 468, 484, 487, 488